(12) United States Patent
Möller et al.

(10) Patent No.: US 7,385,757 B2
(45) Date of Patent: Jun. 10, 2008

(54) SURGICAL MICROSCOPE FOR OPHTHALMOLOGY

(75) Inventors: Gerhard Möller, Aalen (DE); Peter Reimer, Ellwangen (DE)

(73) Assignee: Carl Zeiss AG, Oberkochen (DE)

( * ) Notice: Subject to any disclaimer, the term of this patent is extended or adjusted under 35 U.S.C. 154(b) by 112 days.

(21) Appl. No.: 10/994,337

(22) Filed: Nov. 23, 2004

(65) Prior Publication Data
US 2005/0117209 A1 Jun. 2, 2005

(30) Foreign Application Priority Data
Nov. 28, 2003 (DE) ............... 103 56 347
Feb. 4, 2004 (DE) ............ 10 2004 005 428

(51) Int. Cl.
G02B 21/06 (2006.01)
A61B 18/18 (2006.01)

(52) U.S. Cl. .......................... 359/385; 606/4
(58) Field of Classification Search ............... 359/385, 359/389, 368, 372, 373, 374, 375, 376; 606/4, 606/16
See application file for complete search history.

(56) References Cited
U.S. PATENT DOCUMENTS

| | | | |
|---|---|---|---|
| 5,123,902 A | 6/1992 | Müller et al. | |
| 5,748,367 A * | 5/1998 | Lucke et al. | 359/385 |
| 5,865,829 A * | 2/1999 | Kitajima | 606/3 |
| 6,028,707 A | 2/2000 | Gänswein et al. | |
| 6,909,499 B2 * | 6/2005 | Sander | 356/230 |
| 2003/0048530 A1 * | 3/2003 | Sander | 359/389 |
| 2004/0061932 A1 * | 4/2004 | Pensel et al. | 359/368 |

FOREIGN PATENT DOCUMENTS

WO WO 03/057023 7/2003

* cited by examiner

Primary Examiner—Alessandro Amari
(74) Attorney, Agent, or Firm—Walter Ottesen

(57) ABSTRACT

A surgical microscope (1) for ophthalmology includes a tube unit (5) which permits viewing an area (7) of surgery, especially a forward section of the eye, through a microscope main objective (2). The surgical microscope (1) includes an illuminating system (10) which makes available the illuminating light to illuminate the surgical area (7), especially the forward section of the eye. To provide daylight-like illuminating light, the illuminating system includes a xenon illuminating light source (11) or a metal halide illuminating light source. At least one interference filter (22, 23) is provided in the illuminating beam path (16). The cutoff frequency of the interference filter lies such that illuminating light in the ultraviolet range is filtered out and illuminating light in the visible wavelength range is attenuated, if at all, to an insignificant extent in order to reduce the phototoxicity of the illuminating light for the human eye.

25 Claims, 2 Drawing Sheets

SURGICAL MICROSCOPE FOR OPHTHALMOLOGY

CROSS REFERENCE TO RELATED APPLICATION

This application claims priority of German patent application Nos. 103 56 347.4, filed Nov. 28, 2003, and 10 2004 005 428.2, filed Feb. 4, 2004, the entire contents of which are incorporated herein by reference.

1. Field of the Invention

The invention relates to a surgical microscope having a tube unit which makes it possible to view a surgical area and especially a forward section of the eye through the microscope main objective. The surgical microscope further includes an illumination system which makes available illuminating light to illuminate the surgical area and especially the forward section of the eye. At least one block filter is provided in the illumination beam path. This block filter has a cutoff wavelength which lies such that illuminating light in the shortwave spectral range (especially in the ultraviolet range) is filtered out and the illuminating light in the visible wavelength range is insignificantly, if at all, attenuated in order to reduce the phototoxicity of the illuminating light for the human eye.

2. Background of the Invention

For the field of ophthalmology, surgical microscopes are known which include an illuminating system having an illuminating light source in the form of an incandescent lamp or a halogen lamp.

In the ultraviolet spectral range, these illuminating light sources generate only illuminating light having a low intensity which could injure the human eye.

In addition, surgical microscopes are known which include an illuminating system having a xenon light source for making an illuminating light available. A xenon light source functions as a temperature radiator or thermal source at a temperature of approximately 6,000° K. This light source makes available white illuminating light of high intensity which produces a natural color impression for a human observer with a corresponding illumination of the object area. In a surgical microscope, a microscope image rich in contrast and accurate in detail can be generated by illuminating an object area with xenon light.

Intensive ultraviolet light damages the human eye and is phototoxic for the eye. Because of their high ultraviolet light component, no xenon illuminating light sources are used in surgical microscopes which are designed for ophthalmology.

SUMMARY OF THE INVENTION

It is an object of the invention to provide a surgical microscope which is suitable for use in surgical eye procedures and provides an especially contrast-rich and detail-accurate viewing image of the surgical area for a viewer. The surgical microscope of the invention is for ophthalmology and includes: a tubular unit; a main objective disposed downstream of the tubular unit; the tubular unit defining a viewing beam path passing through the main objective so as to permit viewing a surgical area of the human eye; an illuminating system defining an illuminating beam path leading to the surgical area for illuminating the same; the illuminating system including a xenon illuminating light source or a metal halide light source for generating illuminating light containing light in the visible wavelength range and light in the ultraviolet wavelength range; and, at least one block filter arranged in the illuminating beam path and the block filter having a cutoff wavelength selected to filter out the light in the ultraviolet wavelength range and to at most insignificantly attenuate the light in the visible wavelength range thereby reducing phototoxicity of the illuminating light to the human.

According to a feature of the invention, a xenon illuminating light source or a metal halide illuminating light source is integrated into the illuminating system to make available illuminating light which is similar to daylight.

In a further embodiment of the invention, at least one transmission filter is provided in the illuminating beam path. This transmission filter attenuates the total intensity of the wavelength range of the illuminating light, which lies in the visible range, for the surgical area. This transmission filter can, for example, be configured as a neutral density filter or as a sieve filter. Preferably, the ultraviolet block filter is configured as an interference filter. The ultraviolet interference filter can, for example, have a cutoff wavelength which lies at 408 nm. Placing two ultraviolet interference filters in the illuminating beam path ensures that especially little ultraviolet illuminating light reaches the human eye during eye surgery.

Interference filters are used in laser technology also for the ultraviolet spectral range between 305 and 400 nm. Here, they have the task to filter out a specific narrow-band laser line and therefore to suppress the same.

It has been surprisingly shown that, with such an interference filter, the relatively intense illuminating light of a xenon illuminating light source or an illuminating light source in the form of a metal halide lamp can be attenuated so much that the limit values of 50 $\mu m/cm^2$ in the wavelength range between 305 nm and 400 nm can be guaranteed. These limit values are recommended for surgery on the human eye. The illuminating light of the xenon illuminating light source is relatively intense compared to a halogen light source or a conventional incandescent lamp light source, especially in the radiation range of wavelength $\lambda \leq 400$ nm. The xenon illuminating light source can be a lamp of the Osram lamp series "XBO xenon short arc lamps", which are available with a capacity of 50 watts to 300 watts.

A suitable UV interference filter is disclosed, for example, in U.S. Pat. No. 6,028,707 incorporated herein by reference. This filter includes a carrier substrate of glass upon which a plurality of interference layers are vapor deposited. These layers are ultimately of yttrium fluoride and zinc sulfide. In this filter, twenty interference layers are provided on a substrate of glass and the thickness thereof is set forth in Table 1 of U.S. Pat. No. 6,028,707.

A likewise suitable interference filter is a so-called rugate notch filter which comprises a substrate on which a simple layer is disposed with a continuously changing refractive index. Such filters are, for example, commercially available from the Advanced Technology Coatings company with different selectable filter curves.

The surgical microscope is especially suitable for examining the human eye because of the contrast-rich and detail-accurate microscope image.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
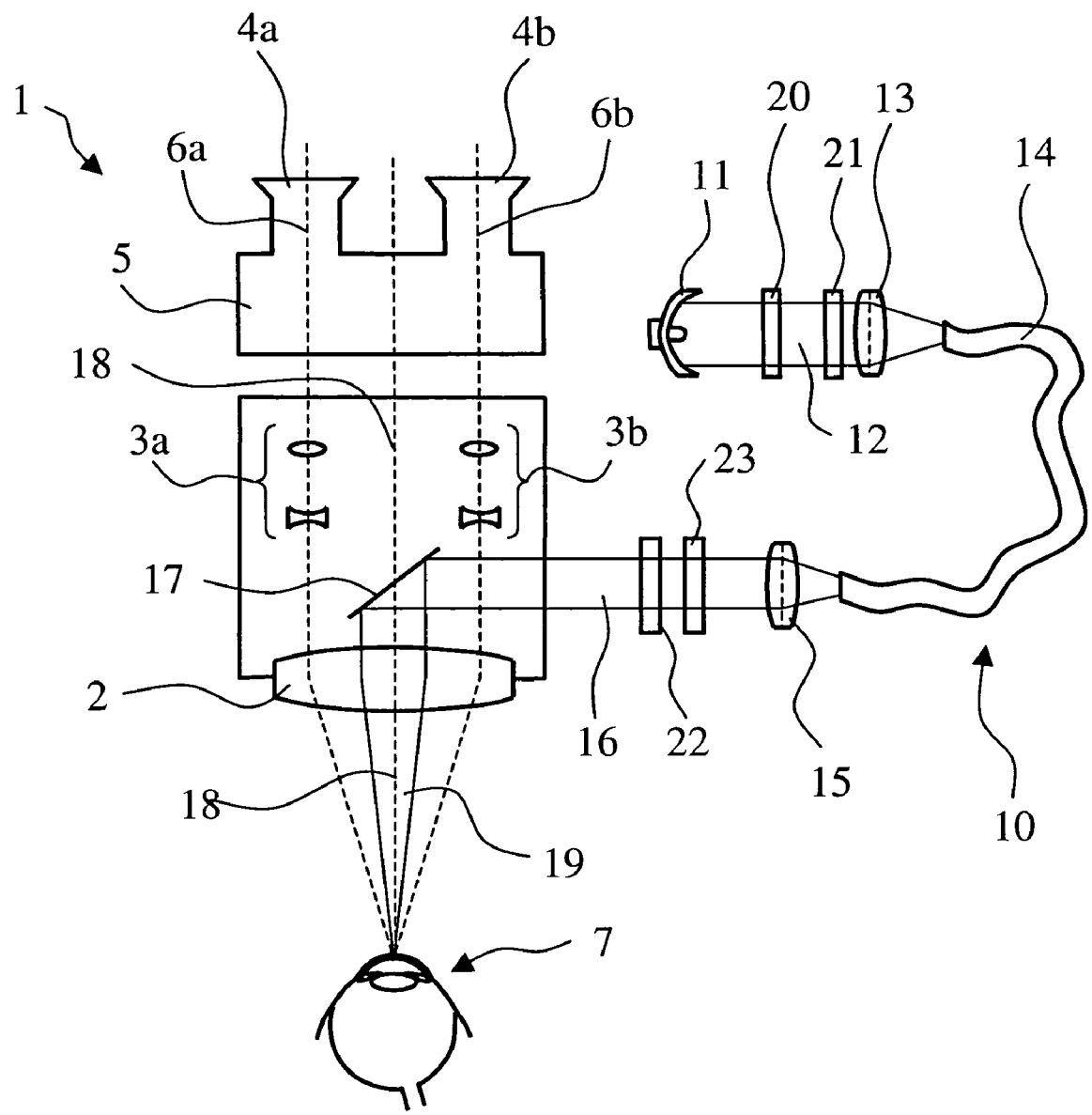
FIG. 1 is a schematic of a surgical microscope for ophthalmology and includes a xenon light source and two UV interference filters.

The surgical microscope 1 of FIG. 1 includes a microscope main objective 2 having a zoom system (3a, 3b) through which an observer can view an object region 7 via ocular eye lenses (4a, 4b) of a tubular unit 5 having a binocular viewing beam path (6a, 6b). An illuminating system 10 is integrated into the surgical microscope 1. The illuminating system 10 has a xenon light source 11 which provides xenon illuminating light. With a first illuminating beam path 12, this xenon illuminating light is coupled via a lens 13 into a light conductor 14. It is understood that it is alternatively also possible to couple the illuminating light directly into the light conductor without an additional lens, for example, via a paraboloid reflector.

It is noted that, in lieu of a xenon light source 11, a metal halide source could be used which generates light having a spectral distribution similar to that of xenon light sources.

The light conductor 14 conducts the illuminating light into the region of the microscope main objective 2. Here, it is coupled out of the light conductor 14 via a lens 15 and is directed with an illuminating beam path 16 via a deflecting mirror 17 parallel to the optical axis 18 of the microscope main objective 2 through the microscope main objective 2 with an object illuminating beam path 19 onto the object area 7.

A filter 20 to filter out the IR illuminating component of the illuminating light is assigned to the xenon light source 11. Furthermore, a transmission filter 21 in the form of a neutral density filter is provided in the illuminating beam path 12. This filter attenuates the illuminating light which passes therethrough by 80%. A sieve filter can also be used in lieu of the neutral density filter. A first UV interference filter 22 and a second UV interference filter 23 are arranged in the illuminating beam path 16 after the illuminating light has been guided through the light conductor 14. It is noted that the interference filters 22 and 23 can basically be mounted also in the illuminating beam path 12 close to the xenon light source 11.

An interference filter generally has the characteristic to almost completely filter out a specific spectral range of radiation to which it is subjected.

Figure 2:
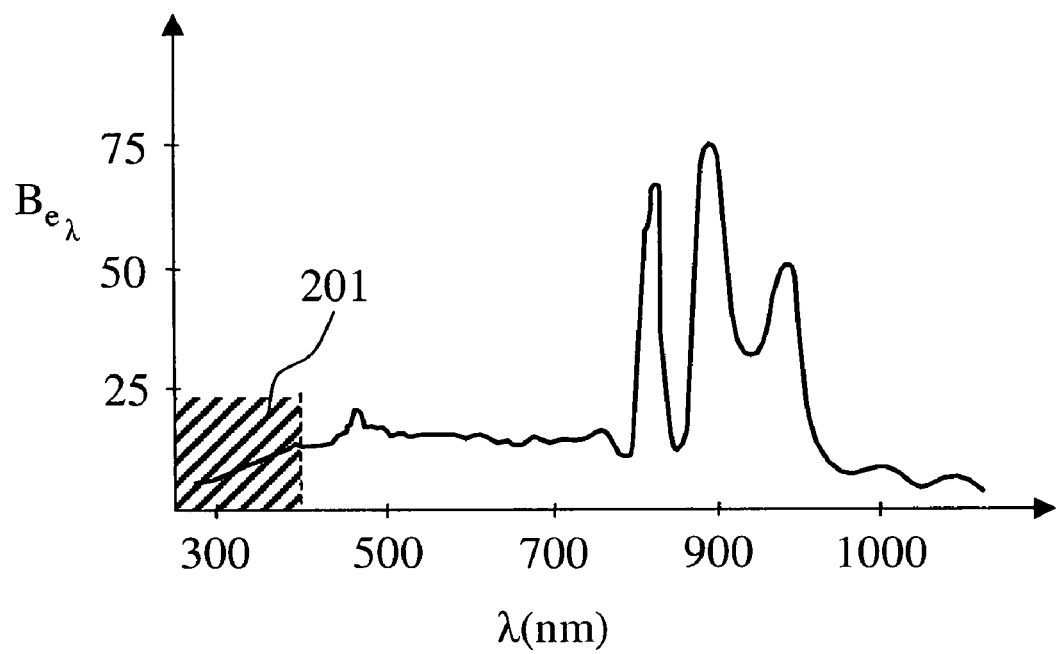
FIG. 2 is a graph showing the spectral intensity of the illuminating light made available by a xenon light source; and, FIG. 3 is a filter curve of an interference filter shown in FIG. 1.

FIG. 2 shows the spectral intensity of the illuminating light made available by the xenon light source. The xenon light source has a comparatively high color temperature which causes the situation that the provided light comes closer to the relative spectral radiant intensity per unit area $B_{e_\lambda}(\lambda)$ of the solar light than would be the case for the light from halogen lamps or incandescent lamps. Correspondingly, in a xenon lamp, comparatively intense illuminating light is made available in the UV spectral range 201 at a wavelength λ below 400 nm.

The two UV interference filters 22 and 23 have respective filter configurations which are set forth hereinafter in Table 1.

TABLE 1

| Layer No. | Layer Material | Layer Thickness in nm |
|---|---|---|
| 1 | A | 10 |
| 2 | B | 15.12 |
| 3 | A | 59.98 |
| 4 | B | 31.88 |
| 5 | A | 59.95 |
| 6 | B | 31.88 |
| 7 | A | 59.95 |
| 8 | B | 31.88 |
| 9 | A | 59.95 |
| 10 | B | 31.88 |
| 11 | A | 59.95 |
| 12 | B | 31.88 |
| 13 | A | 59.95 |
| 14 | B | 31.88 |
| 15 | A | 59.95 |
| 16 | B | 31.88 |
| 17 | A | 59.95 |
| 18 | B | 31.88 |
| 19 | A | 59.95 |
| 20 | B | 14.42 |

The interference filters comprise a substrate on which twenty interference layers are applied which alternate between yttrium fluoride and zinc sulfide. In Table 1, a layer of yttrium fluoride is identified by letter A and a layer of zinc sulfide is identified by letter B. The layer 1 is arranged on a suitable glass substrate and layer 2 is atop layer 1. Layer 3 is atop layer 2, et cetera.

Figure 3:
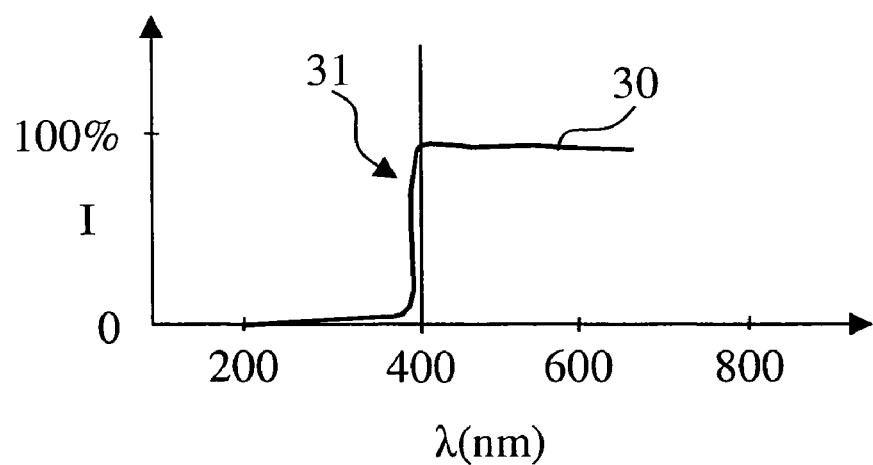

The interference filters 22 and 23 of FIG. 1 have a filter curve 30 which is shown in FIG. 3. These filters have a cutoff wavelength 31 which lies at 408 nm. The filters therefore attenuate the intensity of the illuminating light below 408 nm passing therethrough to a value close to zero and ensure that illuminating light over the entire spectral range visible for the human eye reaches the object region virtually unattenuated.

As can be seen from FIG. 3, the block filter is configured to provide a transition from the ultraviolet wavelength region to the visible wavelength region within a wavelength range of approximately 30 to 40 nm.

In this way, the ultraviolet component of the xenon illuminating light, which reaches the object region, is so low that the irradiation intensity of the light, which is incident thereon, does not exceed the limit value of 50 μm/cm² in the wavelength range between 305 nm and 400 nm. At the same time, illuminating light similar to sunlight in the visible spectral range is supplied to the object region 7 of FIG. 1 with the illuminating light which passes through the filters.

The surgical microscope thereby provides xenon illuminating light which ensures a natural color impression for the observer without being phototoxic for the human eye.

It is understood that the foregoing description is that of the preferred embodiments of the invention and that various changes and modifications may be made thereto without departing from the spirit and scope of the invention as defined in the appended claims.

What is claimed is:

1. A surgical microscope for ophthalmology for examining only a transparent structure of a human eye, the surgical microscope comprising:

a tubular unit;

a main objective disposed downstream of said tubular unit;

said tubular unit defining a viewing beam path passing through said main objective so as to permit viewing said transparent structure of the human eye;

an illuminating system defining an illuminating beam path leading to a surgical area of said transparent structure and continuously illuminating the same;

said illuminating system including a xenon illuminating light source or a metal halide light source for generating illuminating light containing light in the visible wavelength range and light in the ultraviolet wavelength range; and, at least one block filter arranged in said illuminating beam path and said block filter having a cutoff wavelength selected to filter out said light in the ultraviolet wavelength range and to at most insignificantly attenuate said light in said visible wavelength range thereby reducing phototoxicity of said illuminating light to the human eye and providing an illuminating light similar to sunlight in the visible spectral range to said transparent structure.

2. The surgical microscope of claim 1, said illuminating system including at least one transmission filter arranged in said illuminating beam path for attenuating the total intensity of said visible wavelength range of said illuminating light at said surgical area.

3. The surgical microscope of claim 2, wherein said transmission filter is a neutral density filter.

4. The surgical microscope of claim 2, wherein said transmission filter is a sieve filter.

5. The surgical microscope of claim 1, wherein said block filter is an interference filter with a plurality of interference layers.

6. The surgical microscope of claim 1, wherein said block filter is an interference filter having a plurality of interference layers with said layers being alternately of yttrium fluoride and zinc sulfide.

7. The surgical microscope of claim 6, wherein said interference filter has a configuration corresponding to that set forth in the following table:

| Layer No. | Layer Material | Layer Thickness in nm |
|---|---|---|
| 1 | A | 10 |
| 2 | B | 15.12 |
| 3 | A | 59.98 |
| 4 | B | 31.88 |
| 5 | A | 59.95 |
| 6 | B | 31.88 |
| 7 | A | 59.95 |
| 8 | B | 31.88 |
| 9 | A | 59.95 |
| 10 | B | 31.88 |
| 11 | A | 59.95 |
| 12 | B | 31.88 |
| 13 | A | 59.95 |
| 14 | B | 31.88 |
| 15 | A | 59.95 |
| 16 | B | 31.88 |
| 17 | A | 59.95 |
| 18 | B | 31.88 |
| 19 | A | 59.95 |
| 20 | B | 14.42 | wherein "A" identifies a layer of yttrium fluoride and "B" identifies a layer of zinc sulfide.

8. The surgical microscope of claim 1, wherein said block filter has a cutoff wavelength at 408 nm.

9. The surgical microscope of claim 1, wherein said block filter is a first ultraviolet block filter and said illuminating system comprises a second ultraviolet block filter arranged in said illuminating beam path.

10. The surgical microscope of claim 1, wherein said block filter is a rugate notch filter.

11. The surgical microscope of claim 1, wherein said light source provides continuous uninterrupted light for observing said surgical area of said transparent structure.

12. The surgical microscope of claim 11, wherein said block filter is configured to provide a transition from said ultraviolet wavelength region to said visible wavelength region within a wavelength range of approximately 30 to 40 nm.

13. The surgical microscope of claim 1, wherein said block filter filters out only said light in the ultraviolet wavelength range.

14. A method for examining a transparent structure of a human eye comprising the steps of:
(a) providing a surgical microscope for ophthalmology including:
a tubular unit;
a main objective disposed downstream of said tubular unit;
said tubular unit defining a viewing beam path passing through said main objective so as to permit viewing said transparent structure of the human eye;
an illuminating system defining an illuminating beam path leading to a surgical area of said transparent structure;
said illuminating system including a xenon illuminating light source or a metal halide light source for generating illuminating light containing light in the visible wavelength range and light in the ultraviolet wavelength range;
at least one block filter arranged in said illuminating beam path and said block filter having a cutoff wavelength selected to filter out said light in the ultraviolet wavelength range and to at most insignificantly attenuate said light in said visible wavelength range thereby reducing phototoxicity of said illuminating light to the human eye and providing an illuminating light similar to sunlight in the visible spectral range to said transparent structure;
(b) positioning said transparent structure of said human eye in front of said main objective of said surgical microscope;
(c) passing said illuminating light through said block filter and continuously illuminating said transparent structure with said illuminating system; and,
(d) viewing said transparent structure of the human eye by using the viewing beam path defined by the tubular unit and the objective.

15. The method for examining of claim 14, said illuminating system including at least one transmission filter arranged in said illuminating beam path for attenuating the total intensity of said visible wavelength range of said illuminating light at said surgical area.

16. The method for examining of claim 15, wherein said transmission filter is a neutral density filter.

17. The method for examining of claim 15, wherein said transmission filter is a sieve filter.

18. The method for examining of claim 14, wherein said block filter is an interference filter with a plurality of interference layers.

19. The method for examining of claim 14, wherein said block filter is an interference filter having a plurality of interference layers with said layers being alternately of yttrium fluoride and zinc sulfide.

20. The method for examining of claim 14, wherein said interference filter has a configuration corresponding to that set forth in the following table:

| Layer No. | Layer Material | Layer Thickness in nm |
|---|---|---|
| 1 | A | 10 |
| 2 | B | 15.12 |
| 3 | A | 59.98 |
| 4 | B | 31.88 |
| 5 | A | 59.95 |
| 6 | B | 31.88 |
| 7 | A | 59.95 |
| 8 | B | 31.88 |
| 9 | A | 59.95 |
| 10 | B | 31.88 |
| 11 | A | 59.95 |
| 12 | B | 31.88 |
| 13 | A | 59.95 |
| 14 | B | 31.88 |
| 15 | A | 59.95 |
| 16 | B | 31.88 |
| 17 | A | 59.95 |
| 18 | B | 31.88 |
| 19 | A | 59.95 |
| 20 | B | 14.42 | wherein "A" identifies a layer of yttrium fluoride and "B" identifies a layer of zinc sulfide.

21. The method for examining of claim 14, wherein said block filter has a cutoff wavelength at 408 nm.

22. The method for examining of claim 14, wherein said block filter is a first ultraviolet block filter and said illuminating system comprises a second ultraviolet block filter arranged in said illuminating beam path.

23. The method for examining of claim 14, wherein said block filter is a rugate notch filter.

24. The method for examining of claim 14, wherein said light source provides continuous uninterrupted light for observing said surgical area.

25. The method for examining of claim 24, wherein said block filter is configured to provide a transition from said ultraviolet wavelength region to said visible wavelength region within a wavelength range of approximately 30 to 40 nm.

* * * * *

UNITED STATES PATENT AND TRADEMARK OFFICE
CERTIFICATE OF CORRECTION

PATENT NO. : 7,385,757 B2 Page 1 of 1
APPLICATION NO. : 10/994337
DATED : June 10, 2008
INVENTOR(S) : Gerhard Moeller and Peter Reimer It is certified that error appears in the above-identified patent and that said Letters Patent is hereby corrected as shown below:

Column 2:
Line 5: insert -- eye -- after "human".

Column 7:
Line 1: delete "claim 14" and substitute -- claim 19 -- therefor.

Signed and Sealed this

Sixteenth Day of September, 2008

JON W. DUDAS
*Director of the United States Patent and Trademark Office*